United States Patent [19]

Im et al.

[11] Patent Number: 4,963,304

[45] Date of Patent: * Oct. 16, 1990

[54] PROCESS FOR PREPARING MICROPOROUS MEMBRANES

[75] Inventors: Jang-hi Im; C. C. Chau, both of Midland, Mich.

[73] Assignee: The Dow Chemical Company, Midland, Mich.

[*] Notice: The portion of the term of this patent subsequent to Oct. 17, 2006 has been disclaimed.

[21] Appl. No.: 249,034

[22] Filed: Sep. 26, 1988

[51] Int. Cl.$^5$ .................................. B29C 67/20
[52] U.S. Cl. ................................ 264/49; 264/171; 264/211.19; 264/344
[58] Field of Search ............... 264/49, 41, 171, 344, 264/211.19

[56] References Cited

U.S. PATENT DOCUMENTS

| | | |
|---|---|---|
| 3,020,597 | 2/1962 | Smith-Johannsen .............. 264/49 |
| 3,286,992 | 11/1966 | Armeniades et al. . |
| 3,455,773 | 7/1969 | Tessier ............................ 264/49 X |
| 3,544,489 | 12/1970 | Dowbenko et al. ............. 264/49 X |
| 3,565,985 | 2/1971 | Schrenk et al. ................ 264/173 X |
| 3,734,986 | 5/1973 | Kato et al. ........................ 264/49 |
| 3,796,778 | 3/1974 | Gallacher ......................... 264/49 |
| 3,819,782 | 6/1974 | Irie .................................. 264/49 |
| 3,843,570 | 10/1974 | Murayama ....................... 264/49 X |
| 3,869,310 | 3/1975 | Fukushima et al. ............. 264/49 X |
| 3,884,606 | 5/1975 | Schrenk .......................... 264/171 X |
| 3,953,002 | 4/1976 | England, Jr. et al. . |
| 4,408,893 | 10/1983 | Rice ................................. 366/339 |

FOREIGN PATENT DOCUMENTS

| | | | |
|---|---|---|---|
| 2611731 | 10/1976 | Fed. Rep. of Germany ........ | 264/49 |
| 1495835 | 8/1967 | France ............................. | 264/49 |
| 48-33426 | 10/1973 | Japan ............................... | 264/49 |
| 53-16077 | 2/1976 | Japan ............................... | 264/49 |
| 60-90230 | 5/1985 | Japan ............................... | 264/49 |
| 6512918 | 9/1966 | Netherlands ..................... | 264/49 |
| 1043762 | 9/1966 | United Kingdom ............... | 264/49 |
| 1066061 | 4/1967 | United Kingdom ............... | 264/49 |
| 1206887 | 9/1970 | United Kingdom ............... | 264/49 |
| 1243668 | 8/1971 | United Kingdom ............... | 264/49 |
| 1268861 | 3/1972 | United Kingdom ............... | 264/49 |

Primary Examiner—Hubert C. Lorin

[57] ABSTRACT

A process for preparing microporous membranes by coextruding a melt of a plurality of interdigitated layers of at least two polymers, one having preferential solubility over the other, dividing and reorienting the layers of said melt into discrete domains of random orientation, forming a thin membrane or like article and leaching the preferentially soluble polymer out of the resulting article.

28 Claims, 1 Drawing Sheet

PROCESS FOR PREPARING MICROPOROUS MEMBRANES

CROSS REFERENCE TO RELATED APPLICATION

The present application discloses and claims a genus and a species, the genus also being genus to another species disclosed and claimed in copending application Ser. No. 09/249,035 filed on even date herewith and entitled POROUS MEMBRANES AND THEIR PREPARATION.

BACKGROUND OF THE INVENTION

The use of porous membranes in a variety of filtration applications is well known. For such applications, especially ultrafiltration, membranes with a small pore size and narrow pore size distribution are highly desirable so that precise retention or separation of small molecules with a sharp size or molecular weight cutoff value can be obtained.

Porous membranes are conventionally made by solvent casting or mechanical stretching of polymeric films. For example, film having a microporous structure can be prepared by drawing or stretching at ambient temperatures a crystalline, elastic starting film in an amount of about 10 to 300% of its original length with subsequent stabilization by heat setting of the drawn film under a tension such that the film is not free to shrink or can shrink only to a limited extent. Although the pore size can be varied by manipulating the processing parameters, such as stress, stretching rate and temperature, the size distribution is usually broad and sensitive to any fluctuation of processing conditions.

Another type of popular commercial porous membrane is prepared by solvent casting a solution containing a water-soluble additive which is leached from the cast membrane, thus creating the required porosity. The film casting conditions are manipulated to create a very thin active surface embedded on a microporous spongy mass. Such membranes also have the same problem of having a broad distribution of pore size.

Porous films have been made by casting a solvent solution of a resin or cellulose derivative on a temporary support or substrate as a thin film, after which the solvent is removed or exchanged under carefully controlled conditions. Solvent removal and exchange are very slow and adjustment of processing conditions for close control of product characteristics is difficult. Another process for the preparation of porous membranes also starts from a solution of resin or cellulose derivative and includes casting a film of the solution on a support, after which the membrane is formed by precipitation by immersion of the film in a nonsolvent for the resin or cellulose derivative. In still another method, a polymeric film is extruded under conditions of low melt temperature and high melt stress, the extruded film is annealed while in a relaxed or untensioned state, the film is then uniaxially stretched to develop the desired void structure and the resulting porous film is heat treated in a tension state to stabilize the void structure. Tight control of processing conditions is necessary, since pore size and pore size distribution are highly sensitive to fluctuation in processing conditions.

Although the rated pore size for prior art films may be quite small, many of the pores may actually be substantially larger. While it is desirable for microporous films to exhibit sharp size cutoff, i.e., to sharply delineate the size molecule or particle which will pass from the size which will not, prior art films often do not exhibit this property. If they do, they are very expensive to produce.

SUMMARY OF THE INVENTION

It has now been discovered that microporous membranes having a narrow pore size distribution and sharp size cutoff are provided by a process comprising forming a melt of a lamellar composition formed from a plurality of alternating layers, each layer comprising at least two different polymeric materials, at least one of said different polymeric materials having a preferential solubility in a selective solvent with respect to at least one other of said different polymeric materials, wherein each said layer has been divided and reoriented to form discrete domains of random orientation in said melt; forming said melt into a thin solid unitary membrane structure; contacting said solid unitary structure with an extraction medium which has a preferential solubility for one of said two different polymeric materials to remove said preferentially soluble polymeric material from said solid unitary structure to form a porous unitary structure; and separating said extraction medium from said porous unitary structure.

We have developed different techniques for forming said lamellar composition. The present specific embodiment of the invention, which is also believed to be the best mode for practicing the genus, provides a continuous method for preparing microporous membranes comprising forming a melt composition comprising at least two different polymeric materials, at least one of said different polymeric materials having a preferential solubility in a selective solvent with respect to at least one other of said different polymeric materials; forming a stream comprising multiple adjacent layers of said melt composition; passing said stream through a mixing means; forming said mixed stream into a thin solid unitary structure; contacting said solid unitary structure with an extraction medium which has a preferential solubility for at least one of said at least two different polymeric materials, whereby said preferentially soluble polymeric material is removed from said solid unitary structure to form a porous membrane characterized by the presence of uniform pores having a narrow pore size distribution; and separating said extraction medium from said porous unitary structure.

DETAILED DESCRIPTION OF THE PREFERRED EMBODIMENT

Figure 1:
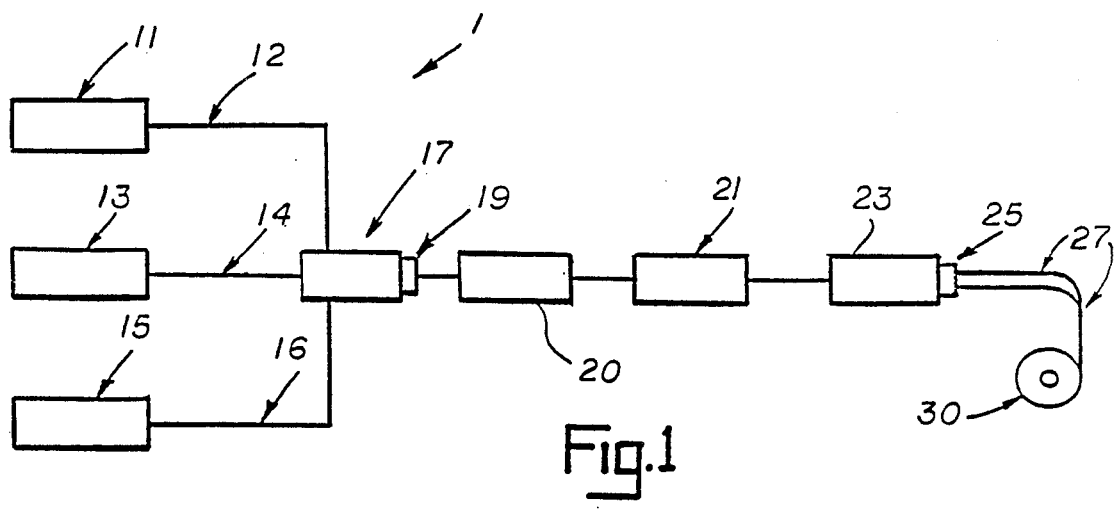
FIG. 1 schematically represents the preparation of blend film employing apparatus in accordance with the present invention.
Figure 2:
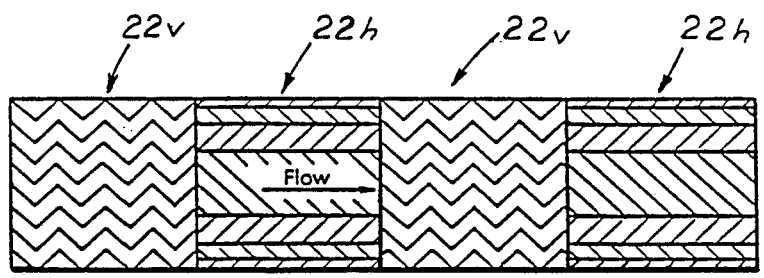
FIG. 2 is a side view of the mixing elements of a static mixer used in this invention.

The method of this invention employs controlled mixing to in situ mix a layered melt stream before the melt stream exits from an extrusion die. The process of this invention permits the in situ conversion of the layered structure into a useful morphology consisting of discrete domains distributed randomly in a continuous matrix. When the material inside the domain is extracted out from the extruded films, membranes with interconnected flow channels, narrow pore sizes and narrow pore size distribution can result. The in situ mixing method of this invention not only provides effective control over pore size and pore size distribution but can also provide membranes with a pore size smaller than normally previously obtained. The method provides for an on-line continuous processing with enhanced process stability and process control. In addition, the morphology and transport properties of the final membrane can be more readily controlled by the choice of equipment and its arrangement in the extrusion line.

The plural adjacent layers or laminate which must be formed in the method of the present invention are formed by coextrusion. Coextrusion or simultaneous extrusion of two or more synthetic resinous materials is well known in the art and has been used for preparing sheet or film containing many layers, for example, 50, 100 or several hundred layers. Coextrusion as employed in this invention can be broadly described as a method for preparing a composite stream of interdigitated diverse synthetic resinous materials comprising providing at least a first stream of a heat-plastified synthetic resinous material and a second stream of heat-plastified thermoplastic material; dividing each stream into a plurality of first substreams and a plurality of second substreams, respectively; combining the substreams to form a composite stream having the first substreams and the second substreams interdigitated; passing the interdigitated substreams through a motionless mixer where the stream of layers is divided and reoriented into a nonlayered configuration of discrete domains of said polymeric materials of random orientation and discharging the stream through a forming die to form a desired configuration such as a film, sheet, pellet or hollow fiber, depending upon the geometry of the forming die. Optionally, the blend layers of the composite stream can have interdigitated between each layer a thin layer of polymeric material which is effective to enhance the adhesion between the layers or improve compatibility between them, particularly in those embodiments wherein individual streams of the different polymers are employed in the first pass through the coextrusion apparatus.

The adaptation of a coextrusion apparatus such as disclosed in U.S. Pat. Nos. 3,565,985 and 3,884,606, both herein incorporated by reference, by incorporating a motionless mixer 21 between the stream combining means 17 and the shaping die 23 (FIG. 1) provides a continuous system of preparing microporous membranes with extremely narrow distributions. The pore size of membranes produced in accordance with this invention is determined by the thickness of layers. The process is more stable, less complicated and more efficient than currently employed conventional processes. In addition, the porosity, pore morphology and mechanical strength can be controlled by adjusting the number of layers, relative layer thickness, layer arrangement and the materials chosen.

The thickness of the individual layers in the starting composite of adjacent layers is an important factor in determining the ultimate pore size of a porous membrane made in accordance with the present invention. Each of the thin layers should have a thickness in the range of from 0.03 to 5 microns, and preferably 0.03 to 1 micron, and most preferably 0.03 to 0.5 micron. Except to the extent that it determines the thickness of the individual layers, the number of layers in the coextruded laminate is no critical. In most coextrusion systems, fewer layers means that each layer is thicker. We have coextruded from 50 to 400 layers and processed them in accordance with the present invention. Pore size tends to decrease with thinner layers, but as the layers become ever thinner, the correlation between pore size and layer thickness is not a direct one.

The apparatus 1 schematically depicted in FIG. 1 comprises in cooperative combination individual sources of heat-plastified thermoplastic polymeric material designated as 11, 13 and 15, respectively, which beneficially are extruders. A stream combining means 17 is in operative communication with the extruders 11, 13 and 15 by suitable conduits 12, 14 and 16, respectively. The apparatus or stream combining means 17 has a discharge side 19 which is in operative communication with a layer multiplier means 20 which has an inlet side in operative communication with discharge 19 and a discharge side in operative communication with motionless mixing device 21. The layer multiplier means serves to increase the number of layers of polymeric material. The motionless mixer serves to divide and reorient the layers of polymeric materials into discrete, random domains. While preferred, the use of multiplier means 20 is optional. Should the apparatus not include multiplier means 20, discharge side 19 of stream combining means 17 is in operative communication with motionless mixing device 21.

Figure 3:
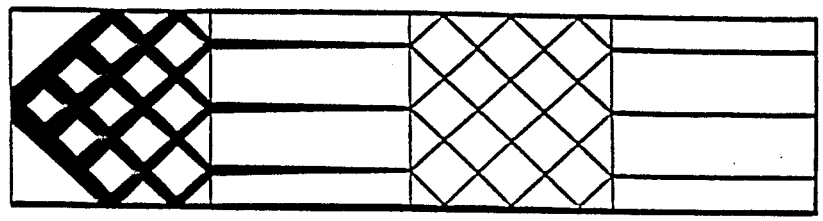
FIG. 3 schematically represents the flow pattern defined by the mixing elements of the mixer of FIG. 2.

The discharge side of motionless mixing device 21 is in operative communication with a stream shaping means or film or sheeting die 23. Motionless mixing device 21 is fixed stationarily to the discharge side of stream combining means 17 and to the inlet side of stream shaping means. Motionless mixing devices such as the device 21 are conventional and well known in the art. Representative examples of conventional motionless mixing devices are disclosed in U.S. Pat. Nos. 3,286,992; 3,953.002; and 4,408,893. A representative motionless mixing device 21 is of the type manufactured and sold by Koch Engineering Co., Inc., Wichita, Kans. 67220, under the designation Koch Melt Blender™. Basically, motionless mixing device 21 includes a plurality of horizontal flow elements 22h and vertical flow elements 22v arranged and connected in coaxial end-to-end relation with the adjacent edges of adjacent baffle members arranged to extend generally parallel to one another (FIG. 3). It is preferred that the motionless mixing device comprise a plurality of such baffle elements 22h and 22v, for example, 4 to 12 or more. Thus, in conventional manner, the motionless mixing device 21 is operative to repetitively divide and recombine the flow of layered thermoplastic material discharging from stream combining means 17 or from multiplier means 20 to effect a laminar flow mixing or blending of the lamellar material, thereby to homogenize the material to break up the layered configuration of the stream and to increase the homogeneity of the dispersion of small individual layered increments within the stream. Die 23 has a die lip 25 defining an appropriate desired geometric shape. Produce 27 is passed from the die lip 25, solidified the wound onto the roll 30. Alternatively, product 27 can be pelletized or diced and recycled back to 11, 13 and 15, or passed directly to a liquid extraction bath, not shown.

In operation of the apparatus of FIG. 1, the sources 11, 13 and 15 supply heat-plastified synthetic resinous material through the conduits 12, 14 and 16, respectively, to the combining apparatus 17 wherein the streams are divided, interdigitated and passed to the discharge 19 as a composite layered stream in which the layers are substantially parallel to each other. The composite stream is passed from discharge 19 through layer multiplier means 20 to the motionless mixer 21 where the stream is intermixed through a progression of divisions and recombinations whereby the essentially layered configuration of the stream is divided and reoriented into discrete, random domains. The stream exiting motionless mixer 21 is passed through shaping means 23 where it is extruded in the form of a thin structure such as pellets, strands, film, sheeting or hollow fibers.

Thus, in forming microporous membranes in accordance with the present invention, a substantially homogeneous mixture of at least two different polymeric materials, at least one of said different polymeric materials having a preferential solubility in a selected solvent with respect to at least one other of said different polymeric materials, is melted to a plastified state, formed into a plurality of interdigitated thin layers, wherein each layer has a thickness in the range from 0.03 to 5 microns, preferably 0.03 to 1 micron and most preferably in the range of 0.03 micron or less, and passed through a motionless mixer where the layered configuration is broken up and individual polymeric materials are dispersed to form domains of each within the other and ultimately discharged through the forming die. The resulting product in the form of a film or hollow fiber or the like is leached by immersion, solvent washing, solvent jet spraying or any other known technique to selectively dissolve at least one of the polymeric materials from the film while leaving at least one polymeric component substantially untouched, to form a membrane having a microporous structure. The membranes prepared in accordance with this invention are characterized by homogeneous microporous structure with a small pore size, narrow pore size distribution and a sharp size or molecular weight cutoff.

In a particularly preferred embodiment, there are provided individual heat-plastified streams of a mixture of polymer A, such as polyethylene; and polymer B, such as polystyrene; employing a coextrusion apparatus such as disclosed in U.S. Pat. No. 3,884,606 modified in accordance with this invention through the incorporation of a motionless mixer between the composite stream forming head and the shaping die. Each of the individual streams are divided into a plurality of substreams which are then combined to form a composite stream having the individual substreams interdigitated. When more than two different polymeric materials are employed, for example, a third polymeric material can be employed as a compatibilizer or as an adhesion promoting or improving adjuvant, the third polymeric material will be interdigitated between each of the individual layers. Otherwise, one can employ one or the other of the polymeric materials A or B as a compatibilizing stream to be interdigitated between each individual blend stream.

The blend stream exiting the motionless mixer is discharged ultimately through an appropriate shaping die and formed into a desired configuration. It has been found that pore size and distribution ca be advantageously affected by employing more than one recycle through the coextrusion apparatus. Currently, experience indicates that three passes of the blended compositions through the coextrusion apparatus appears to be optimum. While more recycles can be made, the advantages accruing from more than three passes do not justify the additional expense. When one uses more than one pass, one can start by segregating the two polymers into separate layers. When the resulting melt is recycled, each layer will comprise a blend of the two polymers.

In forming microporous membranes in accordance with this invention, there must be employed at least two different film-forming thermoplastic polymeric materials which, with respect to each other, exhibit a differential solubility in a common solvent, be it an aqueous or nonaqueous solvent. In other words, the solvent will preferentially dissolve one of the different polymers to a significantly greater degree than the other With this requirement as a criterion, there can be employed substantially any thermoplastic film-forming polymeric material. Particularly preferred are combinations of water-soluble polymers with water-insoluble polymers, and crystalline polymers with noncrystalline or amorphous polymers. It should be noted that combinations of the same kinds of polymers, for example, mixtures of two or more different water-soluble, two or more different water-insoluble, two or more different crystalline or two or more different amorphous polymeric materials can be used, providing that the requirement that a differential solubility between at least two of such materials is met. The soluble polymeric material generally will comprise from 10 to 90 volume percent, preferably 30 to 85 volume percent and most preferably 50 to 80 volume percent, of the soluble-insoluble polymeric composition.

Given the criterion of differential solubility, substantially any combination of film forming thermoplastic polymeric materials can be employed in the practice of the invention. Suitable thermoplastic polymeric materials include acrylonitrile-butadiene-styrene resins, acetal homopolymers and copolymers, acrylics, cellulosics, fluorocarbons, ionomers, low permeability thermoplastics, polyamides, polyarylethers, polyarylsulfones, polycarbonates, thermoplastic polyesters, polyether sulfones, polyolefins, e.g., polyethylene, polypropylene, polybutylene and polyallomers, polyimides and polyamide-imides, polyphenylene oxide, polyphenylene sulfide, polystyrenes and other polyvinylidene aromatic resins, polysulfones and vinyl polymers including polyvinyl acetals, polyvinyl acetate, polyvinyl alcohol, polyvinyl carbazole, polyvinyl chloride, polyvinyl chloride-acetate and polyvinylidene chloride. Representative combinations include polyethylene-polystyrene, polypropylene-polystyrene, polypropylene-polyisobutylene, polysulfone-polyvinyl alcohol and polycarbonate-methylcellulose. Other combinations will come readily to mind.

Compatibilizing and/or adhesion enhancing layers can be interposed between the polymer blend layers. Compatibilizing components are components which are employed in an amount sufficient to improve the compatibility between the diverse polymeric materials. The amount of compatibilizing component typically ranges from 0 to 50, preferably 5 to 20, weight percent, based on the total weight of the membrane composition prior to treatment with the extraction medium. The type of compatibilizing component can vary depending upon factors such as the compositions of the necessary polymeric compositions which are employed. For example, when polymeric components such as polystyrene and polyethylene are employed, a thermoplastic elastomer such as a styrene-butadiene-styrene block copolymer can be employed as a compatibilizing component. In instances when each layer comprises a mixture of two or more different polymeric materials, the compatibilizing layer is preferentially one of the polymers used in the blend. Other interposed polymeric layers are also possible.

As the leaching medium, substantially any solvent material which will selectively leach out at least one of the thermoplastic polymeric components by leaving at leas one of the thermoplastic polymeric components substantially untouched can be employed. For example, chloroform or toluene can be employed to leach polystyrene from polyethylene or polypropylene. Hexane or toluene are effective to leach polyisobutylene from polypropylene. Water can be employed to leach polyvinyl alcohol from polysulfone or methylcellulose from polycarbonate. The selection of a leaching medium is readily ascertainable by the person of ordinary skill in the polymer arts. The thickness of the final membrane material which is to be leached comprises typical thicknesses for such materials. Such thicknesses typically vary from about 0.5 to about 10 mils. Although it is contemplated that this invention will be used primarily to form microporous membranes, it is conceivable that other forms would also be desired, as for example, microporous granules, fibers, etc.

Foil w/PRH-1 Adhesive from York Tape & Label Co., York, PA) around the edges to help maintain the dimensional stability during solvent leaching. Samples cut from the molded film were immersed in toluene for 16 hours to leach out the polystyrene and were dried in vacuum subsequently. They were white and opaque with fine pores distributed uniformly on the surface as observed under SEM. The porosity was determined by weight loss measurements. The pore size distribution was measured by using a Micromeritics Model 9305 mercury intrusion porosimeter. All samples prepared had very narrow pore size distributions The pore size distributions were narrower than commercial microporous membranes (samples 3 and 4) determined by using the same method. The results are listed in the following table:

| Sample No. | Materials | Mean Pore Size, Microns | Size Range, Microns | Max. Size Min. Size | Porosity |
|---|---|---|---|---|---|
| 1 | 35% Polyethylene 65% Polystyrene | 1.05 | 1.72–0.392 | 4.39 | 65% |
| 2 | 55% Polyethylene 45% Polystyrene | 0.652 | 1.72–0.392 | 4.39 | 38% |
| 3 | Millipore Durapore-HVLP (Rated 0.45 Microns) | 0.642 | 2.19–0.188 | 11.7 | — |
| 4 | Millipore PTFE-FGLP (rated 0.2 Microns) | 0.502 | 3.59–0.055 | 65.3 | — |

EXAMPLE 1

Microporous Structure With Narrow Pore Size Distributions Prepared From Polyethylene/Polystyrene Blends With Precision Laver Multipliers And Koch Static Mixers Microlayer coextruded films 2 mil thick containing different ratios of polyethylene and polystyrene were prepared from the microlayer coextrusion process. The process set-up contains a 97 melt channel feedblock, followed by three precision layer multipliers connecting in series for dividing and stacking the melt stream three times. An SMX type Koch static mixer wa put next to the precision layer multipliers, and the extrusion die followed.

Pellets of polyethylene and polystyrene were dry blended beforehand. The blended pellets were fed into all the melt channels. Materials were processed at 400° F. They were divided and folded over three times in the ISG's to convert to a total of 776 layers and then mixed together to form a uniform blend in the Koch mixer. The melt stream came out from the extrusion die, was drawn down, chilled and wound onto the roll.

Four pieces of the films were cut from the roll and compression molded together in a Pasadena hydraulic press at 350° F. The molding condition was 2 minutes preheating, 3 minutes molding under 9,000 pounds load and 10 minutes cooling with circulating water. The prepared films, 2 mil thick, were cut into 2"×2" size and framed with self-adhesived aluminum foils (Solid

EXAMPLE 2

Methanol And Water Transmission Measurements

The transmission rate of water and methanol across membrane sample 1 above was determined by using a 1 inch diameter Amicon Model-12, 10 ml filtration cell. Membranes prepared were loaded in the cell and supported on a stainless steel porous mat which has an effective diameter of 0.85 inch. The cell was applied with air pressure regulated by an Air-Pak filter-regulator. The effluent liquid was collected for rate measurements. Commercial Celgard 2402 microporous polypropylene membranes (2 ply form) were also evaluated as a comparison. The results are shown in the following table:

| Membrane | Fluid | Membrane Thickness, Mil | Air Pressure, PSI | Transmission Rate, cc/in$^2$-min-atm |
|---|---|---|---|---|
| Polyethylene (Sample 1) | Methanol | 1.4 | 20 | 0.97 |
| | Water | 1.4 | 20 | 0.54 |
| Celgard 2402 (2 Ply) | Methanol | 2.0 | 20 | 0.43 |
| | Water | 2.0 | 20 | 0.26 |

The flux of the prepared membranes is higher than that of commercial Celgard 2402 membranes.

The embodiments of the invention in which an exclusive property or privilege is claimed are defined as follows:

1. A process for preparing a microporous membrane having a narrow pore size distribution and sharp size cutoff comprising:
   forming a lamellar polymeric composition by dividing and reorienting a plurality of adjacent layers of polymeric materials, each layer comprising at least two different polymeric materials and having a thickness of from 0.03 to 5 microns to form discrete domains of said polymeric materials of random orientation, at least one of said different polymeric materials having a preferential solubility in a selected solvent with respect to at least one other of said different polymeric materials;

forming a melt composition of said lamellar polymeric composition into a thin solid structure;

contacting said solid unitary structure with an extraction medium which has a preferential solubility for at least one of said at least two different polymeric materials, whereby said preferentially soluble polymeric material is removed from said solid unitary structure to form a porous unitary structure; and separating said extraction medium from said porous unitary structure.

2. A process according to claim 1 which includes forming each of said layers from a mixture of said at least two different polymeric materials.

3. A process according to claim 2 which includes forming each of said layers from another melt of at least one lamellar composition comprising a plurality of thin layers of a first polymeric material interdigitated with thin layers of a second and different polymeric material.

4. A process according to claim 3 which includes providing a compatibilizing polymeric material interdigitated between each layer of said first and second polymeric materials of said one lamellar composition.

5. A process according to claim 4 wherein said compatibilizing polymeric material comprises styrene-butadiene-styrene triblock copolymer.

6. A process according to claim 5 wherein said first polymeric material comprises polyethylene and said second polymeric material comprises polystyrene.

7. A process according to claim 2 wherein said mixture of at least two polymeric materials comprises a mixture of polyethylene and polystyrene.

8. A process according to claim 1 wherein the amount of said preferentially soluble polymeric material is in the range from 10 to 90 volume percent, based on the total volume of said differentially soluble polymeric materials.

9. A process according to claim 8 wherein the amount of said preferentially soluble polymeric material is in the range from 30 to 85 volume percent.

10. A process according to claim 8 wherein the amount of said preferentially soluble polymeric material is in the range from 50 to 80 volume percent.

11. A process according to claim 8 which includes forming each of said layers from a mixture of said at least two different polymeric materials.

12. A process according to claim 11 which includes forming each of said layers from another melt of at least one lamellar composition comprising a plurality of thin layers of a first polymeric material interdigitated with thin layers of a second and different polymeric material.

13. A process according to claim 12 which includes providing a compatibilizing polymeric material interdigitated between each layer of said first and second polymeric materials of said one lamellar composition.

14. A process according to claim 13 wherein said compatibilizing polymeric material comprises styrene-butadiene-styrene triblock copolymer.

15. A process according to claim 14 wherein said first polymeric material comprises polyethylene and said second polymeric material comprises polystyrene.

16. A process according to claim 11 wherein said mixture of at least two polymeric materials comprises a mixture of polyethylene and polystyrene 17. A process for preparing a microporous membrane comprising:

forming a melt blend comprising an admixture of at least two different polymeric materials, at least one of said different polymeric materials having a differential solubility in a selected solvent with respect to at least one other of said different polymeric materials;

forming said melt blend into a melt stream comprising a layered stream of a plurality of thin, substantially parallel layers, each layer comprising a blend of said different polymeric material and being from about 0.03 to about 5 microns in thickness;

passing said melt stream through a mixing means;

forming said mixed melt stream into a solid unitary structure;

contacting said solid unitary structure with an extraction medium which has a differential solubility for at least one of said at least two different polymeric materials whereby said preferentially soluble polymeric material is removed from said solid uniform structure to form a solid unitary microporous structure; and separating said extraction medium from said unitary porous structure.

18. A process in accordance with claim 17 wherein said mixing means comprises a motionless mixer.

19. A process in accordance with claim 17 wherein said polymeric material comprises a mixture of polyethylene and polystyrene.

20. A process according to claim 17 wherein said melt blend comprising a admixture of at least two different polymeric materials is formed from a melt of at least one lamellar composition comprising a plurality of thin layers of a first polymeric material interdigitated with thin layers of a second and different polymeric material.

21. A process according to claim 20 which includes providing a compatibilizing polymeric material interdigitated between each layer of said first and second polymeric materials of said one lamellar composition.

22. A process according to claim 21 wherein said compatibilizing polymeric material comprises styrene-butadiene-styrene triblock copolymer.

23. A process according to claim 22 wherein the amount of said preferentially soluble polymeric material is in the range from 10 to 90 volume percent, based on the total volume of said differentially soluble polymeric materials.

24. A process according to claim 17 wherein the amount of said preferentially soluble polymeric material is in the range from 10 to 90 volume percent, based on the total volume of said differentially soluble polymeric materials.

25. A process according to claim 24 wherein the amount of said preferentially soluble polymeric material is in the range from 30 to 85 volume percent.

26. A process according to claim 25 wherein the amount of said preferentially soluble polymeric material is in the range from 50 to 80 volume percent.

27. The process of claim 17 wherein said melt blend is formed from another melt of at least one lamellar composition comprising a plurality of thin layers of a first polymeric material interdigitated with thin layers of a second and different polymeric material, where said another melt has been passed through said motionless mixer prior to recoextruding.

28. A process according to claim 27 which includes providing a compatibilizing polymeric material interdigitated between each layer of said first and second polymeric materials of said one lamellar composition.

* * * * *

UNITED STATES PATENT AND TRADEMARK OFFICE
CERTIFICATE OF CORRECTION

PATENT NO. : 4,963,304

DATED : October 16, 1990

INVENTOR(S) : Jang-hi Im; et. al.

It is certified that error appears in the above-identified patent and that said Letters Patent is hereby corrected as shown below:

```
Column 1, line 10 delete "even date herewith" and insert
   --September 26, 1988--.
Column 4, line 1, delete "no" and insert --not--; and
        on line 38, "3,953.002" should read --3,953,002--;
        on line 60, "Produce 27" should read --Product 27--.
Column 7, line 9, "leas" should read --least--;
        on line 51, "wa" should read --was--.
```

Signed and Sealed this

First Day of September, 1992

*Attest:*

DOUGLAS B. COMER

*Attesting Officer*   Acting Commissioner of Patents and Trademarks